US008468120B2

(12) United States Patent
Gupta et al.

(10) Patent No.: US 8,468,120 B2
(45) Date of Patent: Jun. 18, 2013

(54) SYSTEMS AND METHODS FOR TRACKING AND REPORTING PROVENANCE OF DATA USED IN A MASSIVELY DISTRIBUTED ANALYTICS CLOUD

(75) Inventors: Himanshu Gupta, New Delhi (IN); Rajeev Gupta, Noida (IN); Mukesh Kumar Mohania, Rajpur Chung (IN); Ullas Balan Nambiar, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/862,376

(22) Filed: Aug. 24, 2010

(65) Prior Publication Data

US 2012/0054146 A1 Mar. 1, 2012

(51) Int. Cl.
*G06F 17/30* (2006.01)

(52) U.S. Cl.
USPC ........................................................ 707/602

(58) Field of Classification Search
None
See application file for complete search history.

(56) References Cited

U.S. PATENT DOCUMENTS

| | | | |
|---|---|---|---|
| 5,193,185 A | 3/1993 | Lanter | |
| 6,356,901 B1 | 3/2002 | MacLeod et al. | |
| 2008/0040181 A1 | 2/2008 | Freire et al. | |
| 2008/0126399 A1* | 5/2008 | MacGregor | 707/102 |
| 2008/0307104 A1* | 12/2008 | Amini et al. | 709/231 |
| 2009/0119548 A1 | 5/2009 | Kollmann et al. | |
| 2009/0234833 A1* | 9/2009 | Davis et al. | 707/5 |
| 2009/0292818 A1* | 11/2009 | Blount et al. | 709/231 |
| 2010/0287204 A1* | 11/2010 | Amini et al. | 707/802 |

FOREIGN PATENT DOCUMENTS

CA 2689216 2/2009

OTHER PUBLICATIONS

Buneman, Peter; Maier, David, and Widom, Jennifer. "Where was your data yesterday, and where will it go tomorrow? Data Annotation and Provenance for Scientific Applications", Feb. 28, 2000, available at http://hermes.dpi.inpe.br:1910/col/dpi.inpe.br/banon/2004/04.21.11.45/doc/BunemanWhereTomorrow.pdf.
Cheney, James, et al., "Provenance: A Future History", OOPSLA 2009, Oct. 25-29, 2009, Orlando, Florida. available at http://www.cs.princeton.edu/~jnfoster/papers/onward-provenance.pdf.
Rajbhandari, Shrija, and Walker, David W., "Incorporating Provenance in Service Oriented Architecture", 2006 IEEE, proceedings of the International Conference on Next Generation Web Services Practices (NWeSP'06), available at http://ieeexplore.ieee.org/xpl/freeabs_all.jsp?reload=true&arnumber=4090002.
Muniswamy-Reddy, Kiran-Kumar et al., "Making a Cloud Provenance-Aware," First Workshop on the Theory and Practice of Provenance (TaPP '09), Final Session, San Francisco, CA, USA, Feb. 2009, pp. 89-90, vol. 34, No. 3.

* cited by examiner

*Primary Examiner* — Bai D. Vu
(74) *Attorney, Agent, or Firm* — Ference & Associates LLC

(57) ABSTRACT

In the context of cloud computing, effective methods and arrangements for storing and tracking provenance. In accordance with at least one embodiment, a distributed file system is advantageously employed to store large amounts of provenance data. File creation involves the creation both of output files and reduce logs.

18 Claims, 7 Drawing Sheets

SYSTEMS AND METHODS FOR TRACKING AND REPORTING PROVENANCE OF DATA USED IN A MASSIVELY DISTRIBUTED ANALYTICS CLOUD

BACKGROUND

Cloud computing is Internet-based computing in which shared resources, software, and information are provided to computers and other devices on demand, as happens analogously with an electricity grid. Applications, that is, different programs that can be downloaded to computers and mobile devices, increasingly are becoming widely available on the cloud, as are larger amounts of information and data that can be widely shared. For instance, Amazon.com Inc. of Seattle, Wash. hosts scientific data for free.

Despite this evolution taking place, cloud services are generally not configured for storing provenance, or information regarding to origin and history of a piece of data. Provenance is also often referred to as lineage and can be important in helping to debug application results, validate data sets, improve search results and meet regulatory compliance.

BRIEF SUMMARY

In summary, one aspect of the invention provides a method comprising: assimilating input data; writing the input data to storage; reducing the input data written to storage; creating an output file and a reduce log from the reduced data; accommodating a provenance query with respect to data in the reduce log.

Another aspect of the invention provides an apparatus comprising: one or more processors; and a computer readable storage medium having computer readable program code embodied therewith and executable by the one or more processors, the computer readable program code comprising: computer readable program code configured to assimilate input data; computer readable program code configured to write the input data to storage; computer readable program code configured to reduce the input data written to storage; computer readable program code configured to create an output file and a reduce log from the reduced data; computer readable program code configured to accommodate a provenance query with respect to data in the reduce log.

An additional aspect of the invention provides a computer program product comprising: a computer readable storage medium having computer readable program code embodied therewith, the computer readable program code comprising: computer readable program code configured to assimilate input data; computer readable program code configured to write the input data to storage; computer readable program code configured to reduce the input data written to storage; computer readable program code configured to create an output file and a reduce log from the reduced data; computer readable program code configured to accommodate a provenance query with respect to data in the reduce log.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
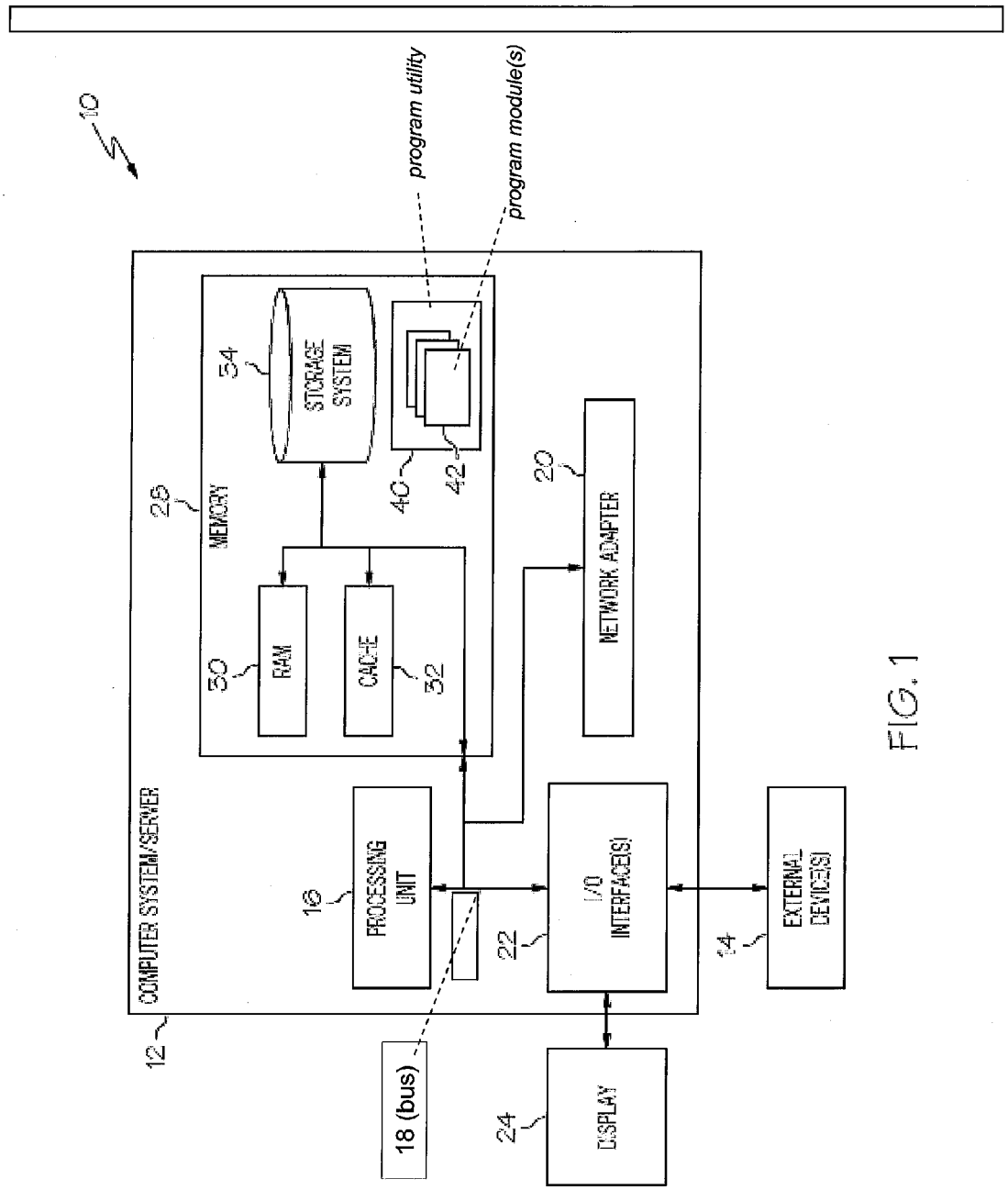
FIG. 1 depicts a cloud computing node according to an embodiment of the present invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
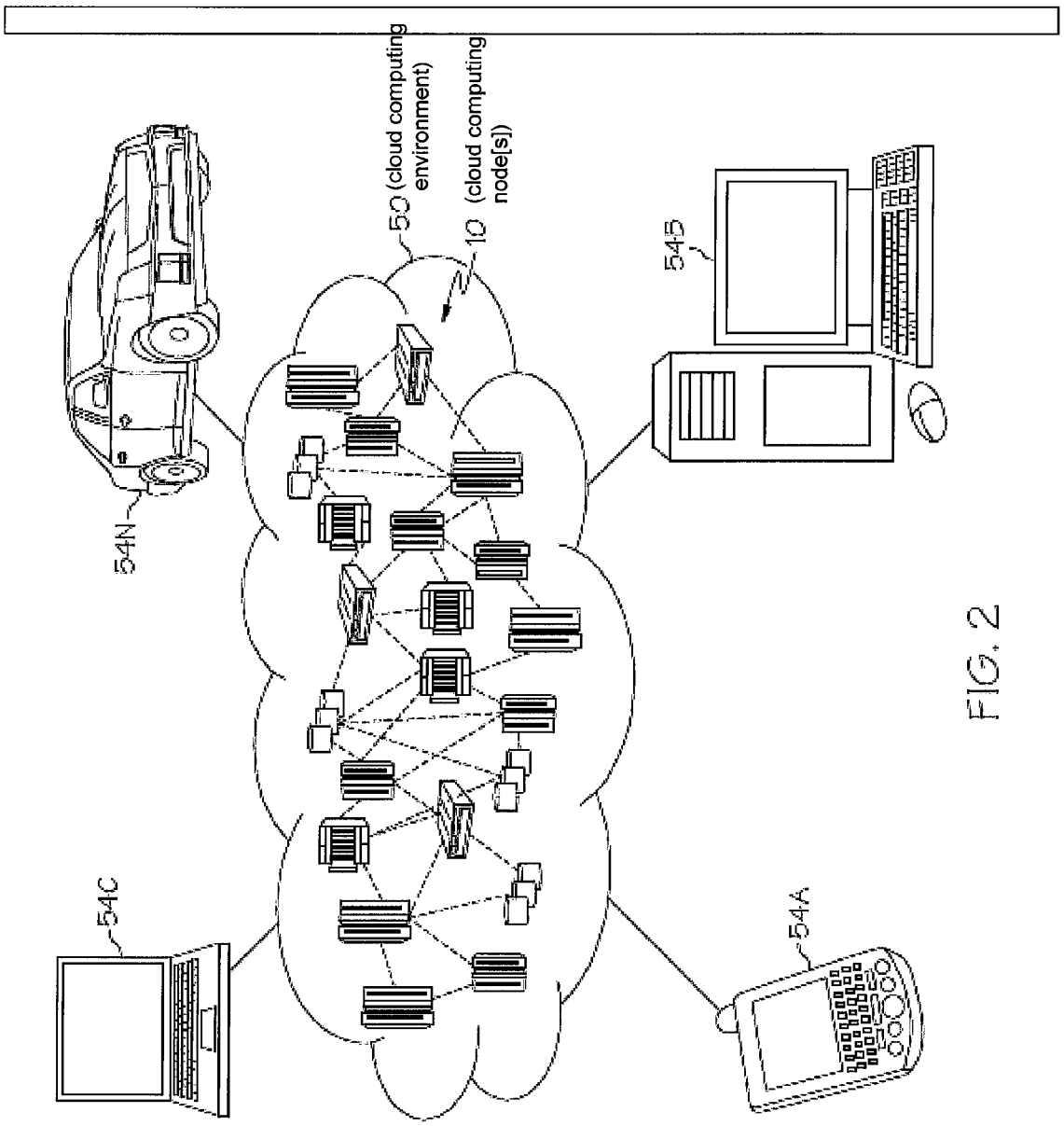
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
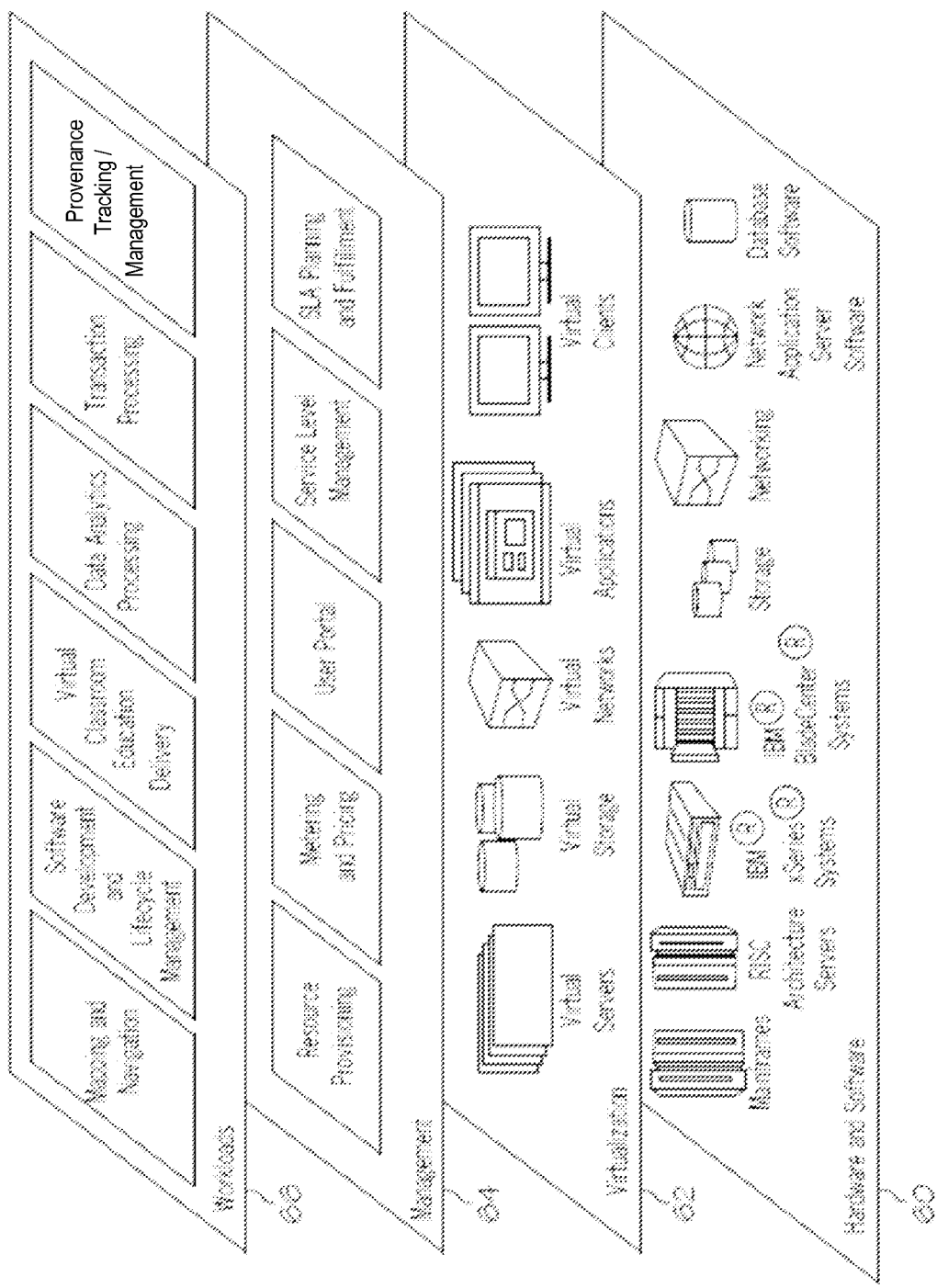
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, in accordance with at least one embodiment of the invention, provenance tracking and management.

Figure 4:
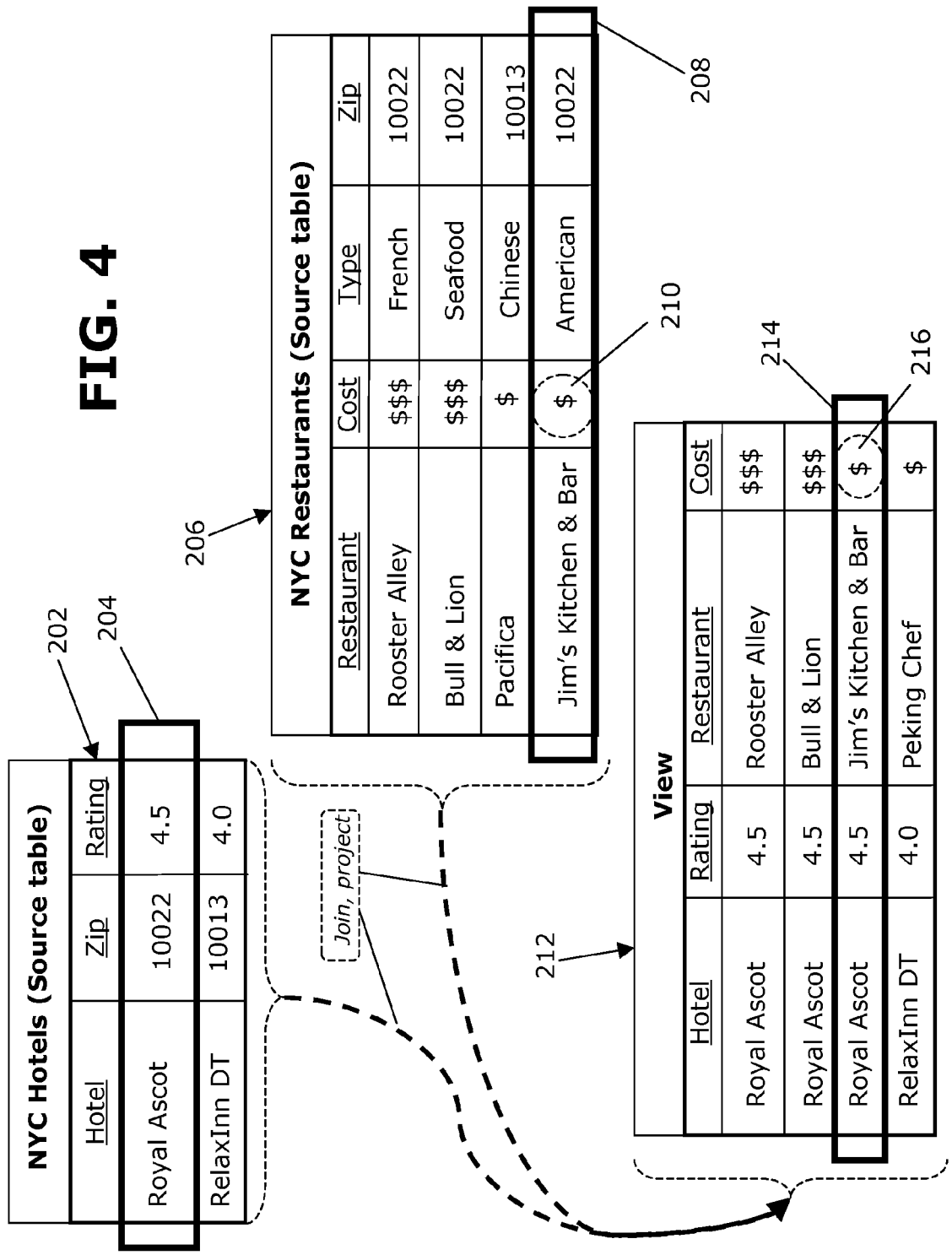
FIG. 4 illustrates a non-restrictive working example showing data flaws that are curable with provenance monitoring and management according to at least one embodiment of the invention.
Figure 5:
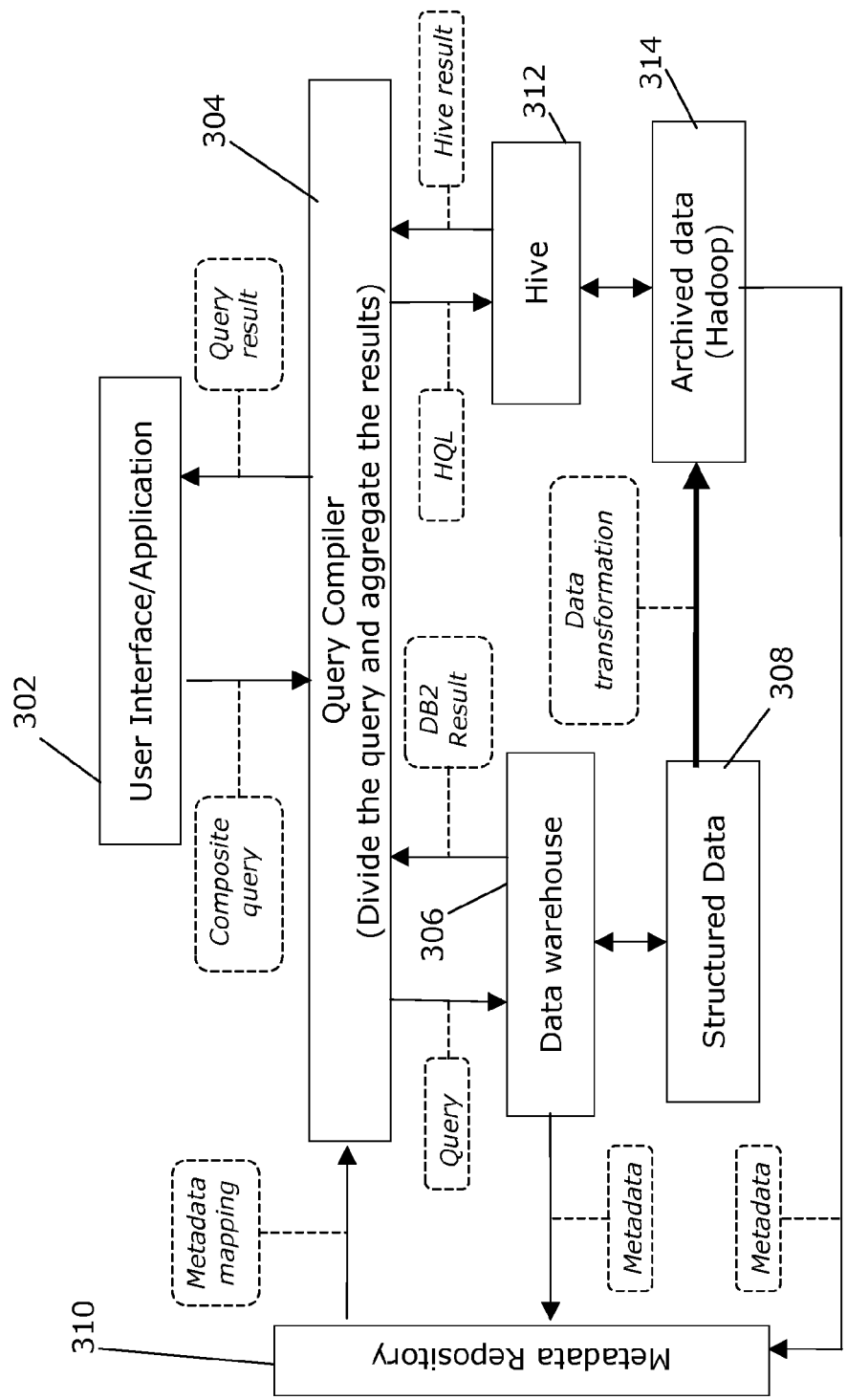
FIG. 5 schematically illustrates a general framework in which provenance queries can be handled, in accordance with at least one embodiment of the invention.
Figure 6:
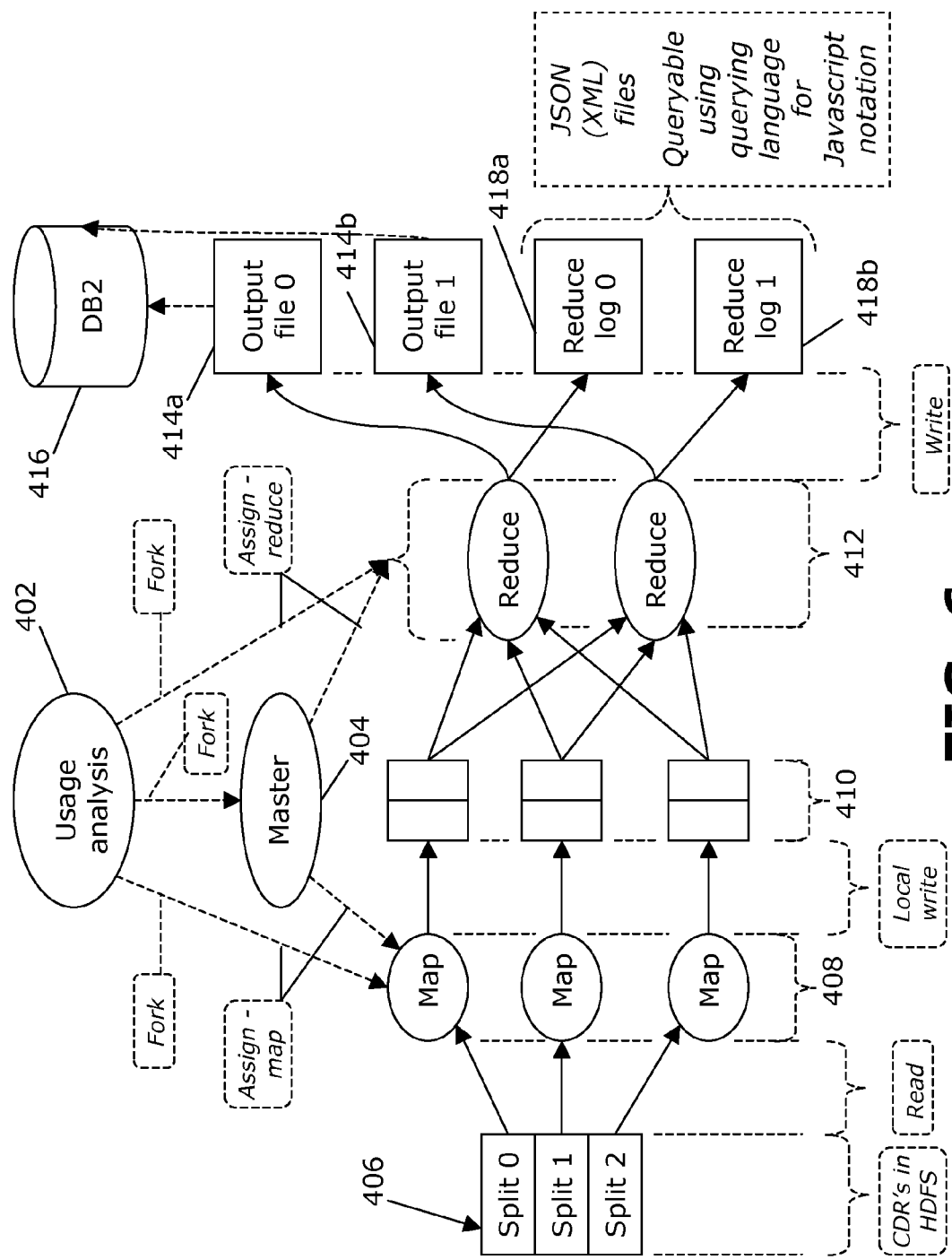
FIG. 6 schematically illustrates, in accordance with at least one embodiment of the invention, a non-restrictive example of a system and method for storing and tracking provenance.

The disclosure now turns to FIGS. 4-6. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1 and as carried out on layer 66 in FIG. 3. In accordance with an example embodiment, most if not all of the process steps, components and outputs discussed with respect to FIGS. 4-6 can be performed or utilized by way of a processing unit or units and system memory such as those indicated, respectively, at 16 and 28 in FIG. 1, whether on a server computer, a client computer, a node computer in a distributed network, or any combination thereof.

FIG. 4 illustrates a non-restrictive example where provenance monitoring and management can correct flaws in transmitting or combining data. As shown, a first hypothetical data source table 202 shows hotels in New York City, their zip codes, and a rating of each on a scale from 1 to 5. Here, the entry 204 for "Royal Ascot" shows a rating of 4.5

A second hypothetical data source table 206 shows restaurants in New York City, their zipcodes, the type of food and a relative cost indicator ranging from "$" to "$$$" (the former indicating the most inexpensive restaurants and the latter indicating the most expensive restaurants). Here, the entry 208 for "Jim's Kitchen and Bar" shows a cost indicator 210 of "$", or "most inexpensive".

FIG. 4 then assumes a process of joining and projecting data from the tables 202/206, wherein a new "view" table 212 is created and shows hotels, the ratings for the hotels, restaurants projected to be located within the hotels, and cost indicators for the restaurants. Entry 214 shows the "Royal Ascot" including the restaurant, "Jim's Kitchen and Bar", which for the purposes of the present example is incorrect. Intuitively, it strains credulity to assume that an inexpensive restaurant ("$") would be located within a hotel with a rating of 4.5 on a 1-to-5 scale. However, suitable provenance monitoring/ management can act to reasonably determine where or why a breakdown in the combination of data from the two original tables 202/206 occurred. Or, put another way, legitimate questions can be posited as to "where" the data came from and "why" it is there.

Thus, by way of a non-restrictive and illustrative example, viable provenance monitoring and management can determine whether, for instance, data from entries 204 and 208 may have been combined by dint of having the same zipcode. Or, for example, it could be determined as to whether the, "Jim's Kitchen and Bar" indeed is located in the "Royal Ascot" and might, for instance, be a less expensive restaurant by dint of serving American instead of other types of food.

Generally, then, it can be appreciated that the storing and tracking or provenance often presents a host of challenges, which include the tracking of schema evolution and the granularity of record needed or desired. Multiple derived data sources can present difficulties, as can different or changing contexts of data usage and any evolution in best practices. Further, a perennial challenge is in finding and choosing a suitable location for storing provenance records. Ideally, suitable provenance monitoring and management can offer a special and highly useful form of audit trail that traces each step in sourcing, moving, and processing data, applicable to a single data item, a logical data record, a subset of a database, or to an entire database.

Conventionally, analysts run ad-hoc queries to evaluate the correctness of data. However, such analysts tend to be highly limited in the number of queries they are able to run. Particularly, difficulties are encountered in capturing provenance, in that data that need to be employed typically traverse multiple steps (or scripts) before reaching a data warehouse.

FIG. 5 schematically illustrates a general framework in which provenance queries can be handled, in accordance with at least one embodiment of the invention. A user at an interface 302 sends (often composite) queries to, and receives results from a query compiler 304. The compiler 304 itself normally divides composite queries and aggregates results of different queries; this division of queries will be further appreciated from the discussion below.

Indicated at 306 is a DB2, or data warehouse, that in conventional arrangements would normally handle provenance queries alone. As shown, the query compiler 304 sends queries to and receives results from DB2 306. Since such data warehouses can be costly to install and maintain, it is normally a challenge to rely on such warehouses for storing data beyond a limited amount.

In accordance with at least one embodiment of the present invention, the data warehouse creates structured data 308 which, when transformed, is archived in a Hadoop distributed file system. This is a "cloud" file system designed to run on commodity hardware, developed by the Apache Software Foundation of Forest Hill, Md., and is presented here merely by way of example; essentially any suitable distributed file system may be employed here. As such, the file system is associated with a large quantity of nodes, often in the form of relatively inexpensive computers as compared to a data warehouse, thus allowing for the storage of enormous quantities of data that would otherwise be prohibitively expensive for data warehouses to handle. The structured data 308 may retain its format or be transformed while the transfer takes place.

Indicated at 312 is a "Hive" data warehouse that is an open-source data warehouse infrastructure built on top of Hadoop. In accordance with at least one embodiment of the invention, Hive 312 accepts queries from compiler 304 (in Hive Query Language, or HQL). While Hive 312 is presented here as a non-restrictive example wherein essentially any suitable data warehouse infrastructure capable of handling queries for distributed file systems may be employed.

In accordance with at least one embodiment of the invention, a metadata repository 310 is provided which receives metadata from the DB2 306 and from archived data 314, and then accords metadata mapping to the query compiler 304.

In accordance with at least one embodiment of the invention, the user at interface 302 is not made aware of any data splitting that takes place "behind the scenes" and thus essentially is "oblivious" to any manner in which a query might access data warehouse 306 and/or archived data 314. For instance, if a query involves accessing data that is up to 6 months old, data warehouse 306 might contain data that are up to 3 months old while older data might be in the archived data 314 of the distributed file system. Accordingly, query compiler 304, in accordance with at least one embodiment of the invention, acts to split the query to head to the different destinations involved (e.g., in the present example, to data warehouse 306 and Hive 312).

The metadata repository 310 contains system level information about the schema of tables copied from data warehouse 306, if any transformation has been done. For instance, such information could indicate if have various tables been merged together or if any new fields like timestamps been added to the data when copied to archived data 314. Essentially, metadata repository 310 maintains a manner of one-to-one mapping between a table in data warehouse 306 to a corresponding file that is stored in archived data 314. This mapping is useful in splitting the composite query into an SQL query on data warehouse 306 and a query on Hive 312.

Broadly contemplated herein, in accordance with at least one embodiment of the invention, are methods and arrangements for storing and retrieving the provenance of structured datasets used or derived by applications or algorithms in a map-reduce based analytics cloud. Particularly, the use of queryable reduce logs is broadly contemplated herein in order to undertake the functions just mentioned. Since the data and computation needs for monitoring and managing provenance can be massive, and since the tracking of numerous operations over a large number of data pieces can lead to significant storage and performance overheads, several input files typically need to be read to generate a piece of output. In accordance with at least one embodiment of the invention, a map-reduce framework itself is employed to make these tasks considerably more manageable.

In accordance with at least one embodiment of the invention, provenance storage and management is undertaken via principles of atomicity, wherein at storage time both provenance and data should be stored or neither of the two are stored, and consistency, wherein at query retrieval time, any data returned are consistent with provenance. Further, the provenance and data of an ancestor object are recorded and there are no dangling references. Accessibility is enhanced by availing provenance to users who either wish to verify properties of their data or simply be aware of its lineage.

FIG. 6 schematically illustrates, in accordance with at least one embodiment of the invention, a non-restrictive detailed example of a system and method for storing and tracking provenance. As shown, a usage analysis program 402, in a process in accordance with at least one embodiment of the invention, is undertaken by a user via a master node 404 in a Hadoop cluster (or a primary node that is connected to other nodes in the cluster). In a manner to be further appreciated herebelow, the master node 404 takes input from the usage analysis program 402 (i.e. files to be read, any parameters etc.), divides it up into smaller inputs, and distributes these to worker nodes (e.g., as indicated by the "map" and "reduce" ellipses at 408 and 412). While "map" and "reduce" may run on different worker nodes, in smaller clusters these may run on the same node.

In the example of FIG. 6, call data records (CDR's) are stored via a Hadoop distributed file system, again presented here merely by way of example. As such, a very large number of CDR's can be involved, numbering perhaps in the billions.

In accordance with at least one embodiment of the invention, the CDR's are split into three groups 406 (Split 0, Split 1, Split 2). After the records are read, the master module 404 applies maps 408 (at nodes corresponding to each of the "map" ellipses in the drawing) to the data according to a predetermined list of tasks and of values or types of values to extract. The mapped data is then written to corresponding intermediate storage files 410.

The next steps, in accordance with the example embodiment shown, involve reducing the files and then writing same to two output files and two reduce logs. As shown, two reduce jobs 412 (at nodes corresponding to each of the "reduce" ellipses in the drawing) receive data from the three intermediate files to then create two output files 0/1 (414a/b) as well as two reduce logs 0/1 (418a/b). The output files can then be stored in a database 416 (e.g., a data warehouse).

In accordance with the example embodiment of FIG. 6, the reduce logs 418a/b written by reduce jobs 412 in the illustrated map-reduce program are written in JSON (JavaScript Object Notation) format (XML). This permits variability of schema in the reduce logs 418a/b, in that various rows in the files may not have an equivalent number of features or attributes; this contrasts with a structured or relational model, where all the rows in a table are considered to have the same number of features. A querying interface for a querying language for Javascript notation may then be employed for querying the reduce logs 418a/b.

It can be appreciated that there are advantageous features of the process, in creating reduce logs 418a/b, that are application-agnostic (i.e., applicable to essentially application). These features include, but are not necessarily limited to: a count of map jobs; distinct files read by maps; name of the output file, written only after output files are saved; and an assurance of atomicity.

In accordance with at least one embodiment of the invention, a meta-reduce log can be produced which is a combination of reduce logs from all reduce jobs in a program or chain of programs. This can be undertaken in any of a variety of ways. For instance, since it is possible to create a sequence of map reduce jobs (or programs) for execution on Hadoop, all of these reduce logs of these individual programs could be combined to create a single log for the sequence.

Figure 7:
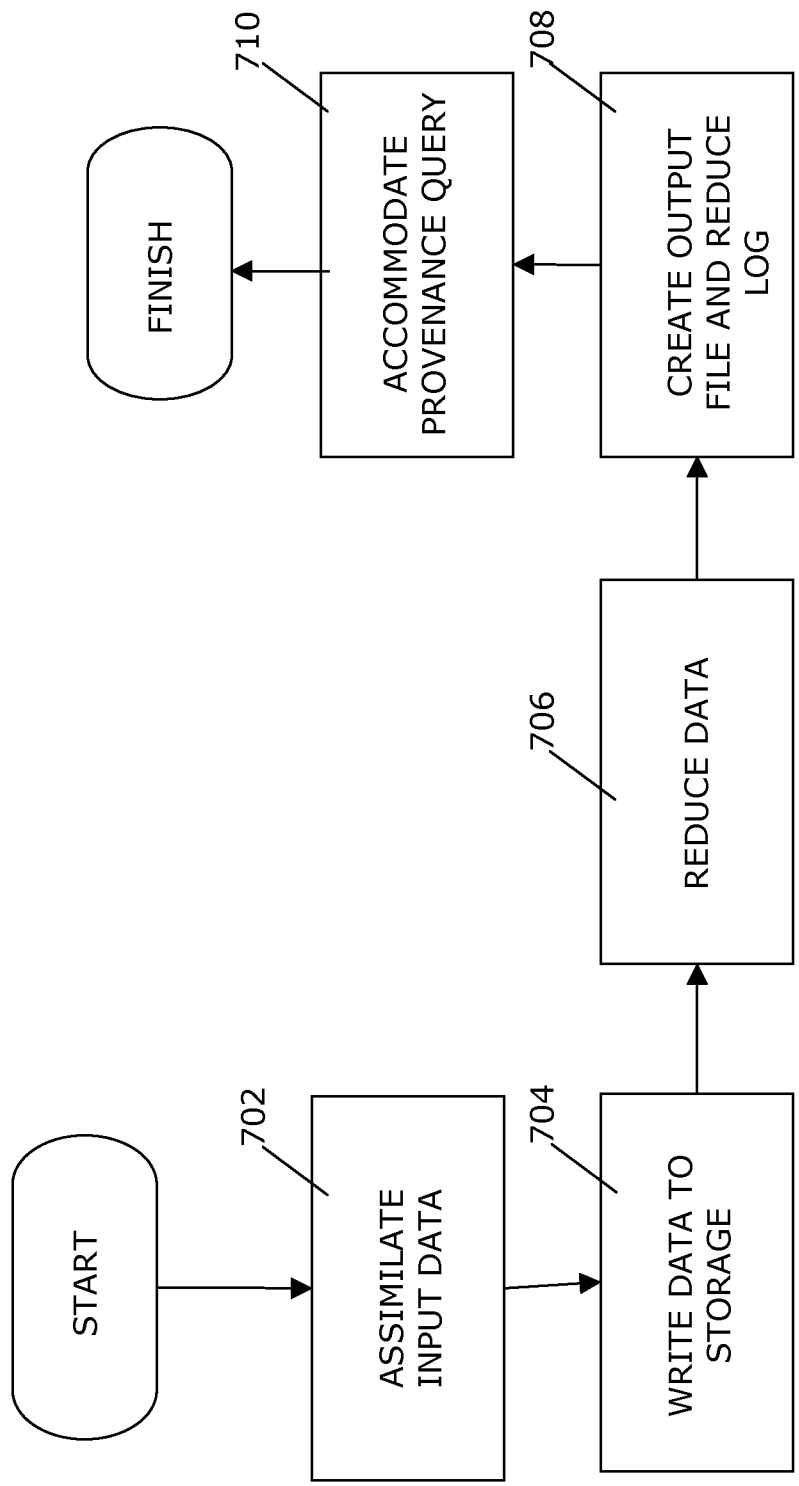
FIG. 7 sets forth a process more generally for provenance tracking and management.

FIG. 7 sets forth a process more generally for provenance tracking and management in accordance with at least one embodiment of the invention. It should be appreciated that a process such as that broadly illustrated in FIG. 8 can be carried out on essentially any suitable computer system or set of computer systems, which may, by way of an illustrative and on-restrictive example, include a system such as that indicated at 12 in FIG. 1 and as carried out on layer 66 in FIG. 3. In accordance with an example embodiment, most if not all of the process steps discussed with respect to FIG. 10 can be performed by way a processing unit or units and system memory such as those indicated, respectively, at 16 and 28 in FIG. 1.

As shown in FIG. 7, input data are assimilated (702) and the input data are written to storage (704). These data are then reduced (706) and an output file and reduce log are created therefrom (708). In step 710, a provenance query is accommodated with respect to data in the reduce log.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing a processor to execute computer code configured to perform the steps of:
assimilating input data;
writing the input data to storage;
reducing the input data written to the storage;
creating an output file and a reduce log from the reduced data; and
accommodating a provenance query with respect to data in the reduce log;
wherein the reduce log is created by a reduce node in a map-reduce cluster.

2. The method according to claim 1, further comprising writing of the output file to warehouse storage.

3. The method according to claim 1, wherein said writing comprises writing the input data to one or more intermediate files.

4. The method according to claim 1, wherein said writing comprises mapping the input data to the storage.

5. The method according to claim 1, wherein said assimilating comprises assimilating input data split into multiple files.

6. The method according to claim 1, wherein said accommodating comprises assessing the query and splitting the query.

7. The method according to claim 6, wherein said splitting comprises directing a first query to a data warehouse.

8. The method according to claim 7, wherein said splitting comprises directing a second query to cloud storage.

9. An apparatus comprising:
one or more processors; and
a computer readable storage medium having computer readable program code embodied therewith and executable by the one or more processors, the computer readable program code comprising:
computer readable program code configured to assimilate input data;

computer readable program code configured to write the input data to storage;

computer readable program code configured to reduce the input data written to the storage;

computer readable program code configured to create an output file and a reduce log from the reduced data; and computer readable program code configured to accommodate a provenance query with respect to data in the reduce log;

wherein the reduce log is created by a reduce node in a map-reduce cluster.

10. A computer program product comprising:

a computer readable storage medium having computer readable program code embodied therewith, the computer readable program code comprising:

computer readable program code configured to assimilate input data;

computer readable program code configured to write the input data to storage;

computer readable program code configured to reduce the input data written to the storage;

computer readable program code configured to create an output file and a reduce log from the reduced data; and computer readable program code configured to accommodate a provenance query with respect to data in the reduce log;

wherein the reduce log is created by a reduce node in a map-reduce cluster.

11. The computer program product according to claim 10, further comprising computer readable program code configured to write the output file to storage.

12. The computer program product according to claim 11, wherein said computer readable program code is configured to write the output file to warehouse storage.

13. The computer program product according to claim 10, wherein said computer readable program code is configured to write the input data to one or more intermediate files.

14. The computer program product according to claim 10, wherein said computer readable program code is configured to map the input data to the storage.

15. The computer program product according to claim 10, said computer readable program code is configured to assimilate input data split into multiple files.

16. The computer program product according to claim 10, wherein said computer readable program code is configured to assess the query and split the query.

17. The computer program product according to claim 16, wherein said computer readable program code is configured to direct a first query to a data warehouse.

18. The computer program product according to claim 17, wherein said computer readable program code is configured to direct a second query to cloud storage.

* * * * *